(12) United States Patent
Danikhno et al.

(10) Patent No.: US 9,672,341 B2
(45) Date of Patent: Jun. 6, 2017

(54) SYSTEMS AND METHODS FOR SPOOF DETECTION IN IRIS BASED BIOMETRIC SYSTEMS

(71) Applicant: Delta ID Inc., Fremont, CA (US)

(72) Inventors: Oleksiy Danikhno, Mountain View, CA (US); Alexander Ivanisov, Newark, CA (US); Salil Prabhakar, Fremont, CA (US)

(73) Assignee: Delta ID Inc., Fremont, CA (US)

( * ) Notice: Subject to any disclaimer, the term of this patent is extended or adjusted under 35 U.S.C. 154(b) by 111 days.

(21) Appl. No.: 14/528,619

(22) Filed: Oct. 30, 2014

(65) Prior Publication Data

US 2016/0125178 A1    May 5, 2016

(51) Int. Cl.
| | |
|---|---|
| *G06K 9/00* | (2006.01) |
| *G06F 21/32* | (2013.01) |
| *G06F 21/55* | (2013.01) |
| *G06F 21/60* | (2013.01) |
| *H04L 29/06* | (2006.01) |
| *G06F 17/30* | (2006.01) |

(52) U.S. Cl.
CPC .............. *G06F 21/32* (2013.01); *G06F 17/30* (2013.01); *G06F 21/554* (2013.01); *G06F 21/608* (2013.01); *H04L 63/0861* (2013.01); *G06F 2221/031* (2013.01)

(58) Field of Classification Search
CPC .................. G06F 21/32; G06F 21/55

USPC .......................................... 382/117
See application file for complete search history.

(56) References Cited

U.S. PATENT DOCUMENTS

| | | | |
|---|---|---|---|
| 2009/0060286 A1 | 3/2009 | Wheeler et al. | |
| 2013/0089240 A1 | 4/2013 | Northcott et al. | |
| 2014/0044321 A1 | 2/2014 | Derakhshani et al. | |
| 2016/0117544 A1* | 4/2016 | Hoyos ................. | G06K 9/0061 348/78 |

OTHER PUBLICATIONS

International Search Report and Written Opinion for Application No. PCT/US2015/058023 dated Jan. 21, 2016.

* cited by examiner

*Primary Examiner* — Ruiping Li
(74) *Attorney, Agent, or Firm* — Lerner, David, Littenberg, Krumholz & Mentlik, LLP

(57) ABSTRACT

The invention provides methods, systems and computer program products for spoof detection in iris based biometric recognition. In an embodiment, the invention comprises (i) obtaining a first image of an iris at an imaging apparatus configured to a first exposure setting (ii) obtaining a second image of the iris at the imaging apparatus configured to a second exposure setting (iii) comparing incidence of reflection patterns within the first and second iris images and (iv) determining authenticity of the imaged iris based on a result of comparing the incidence of reflection patterns within the first and second iris images.

12 Claims, 14 Drawing Sheets

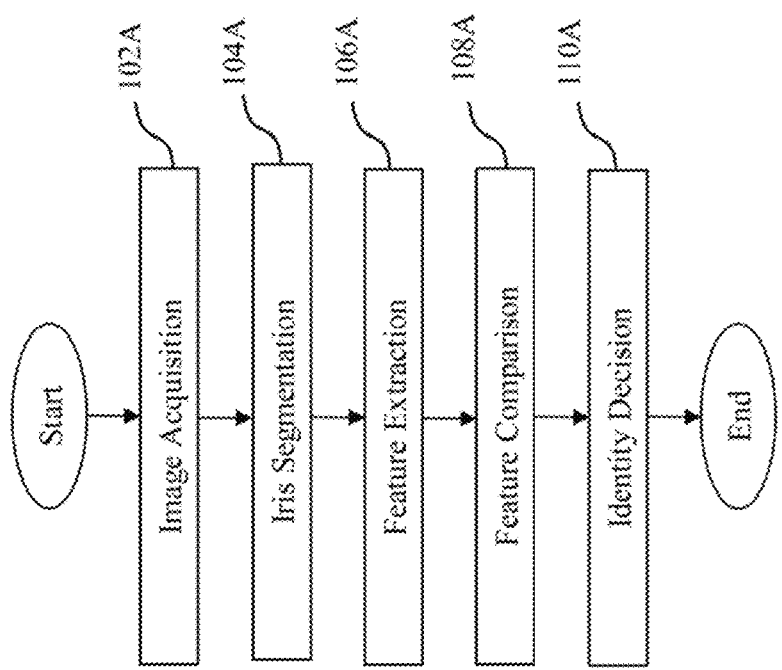

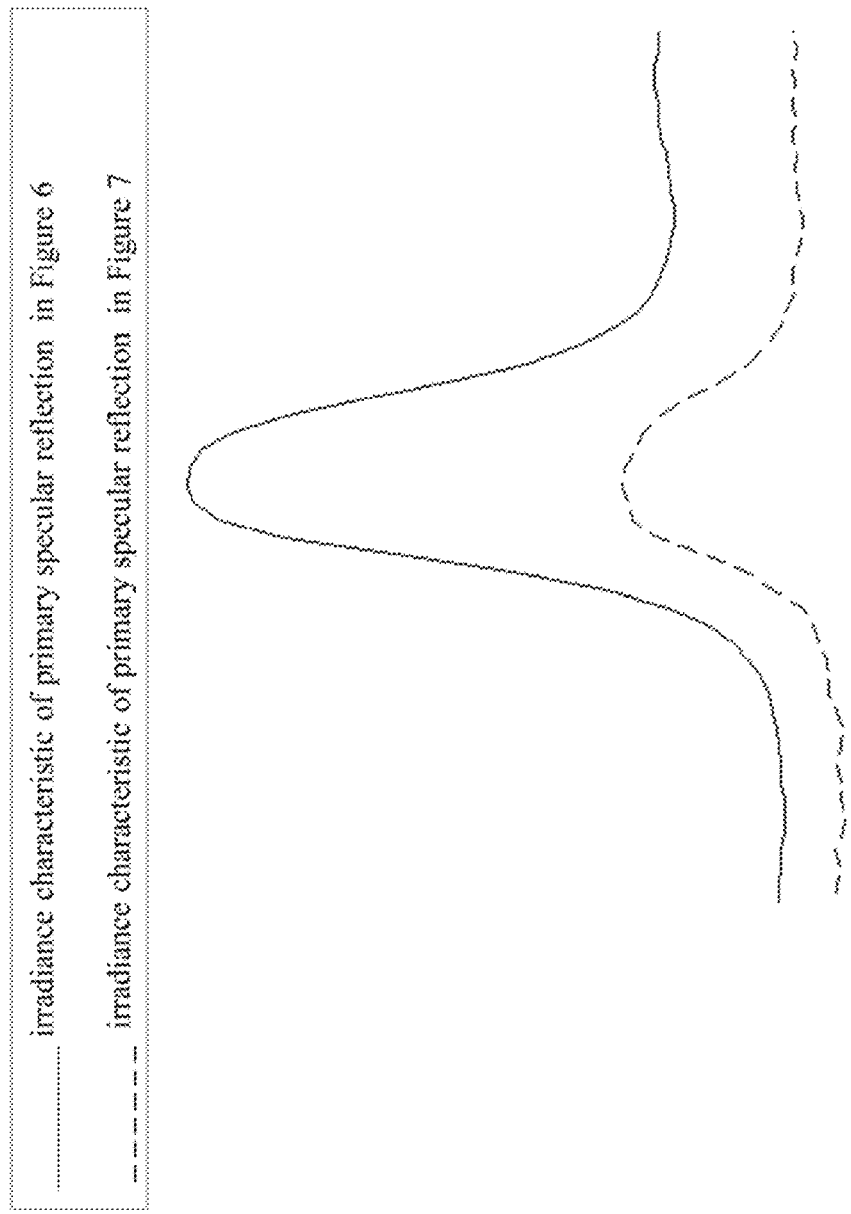

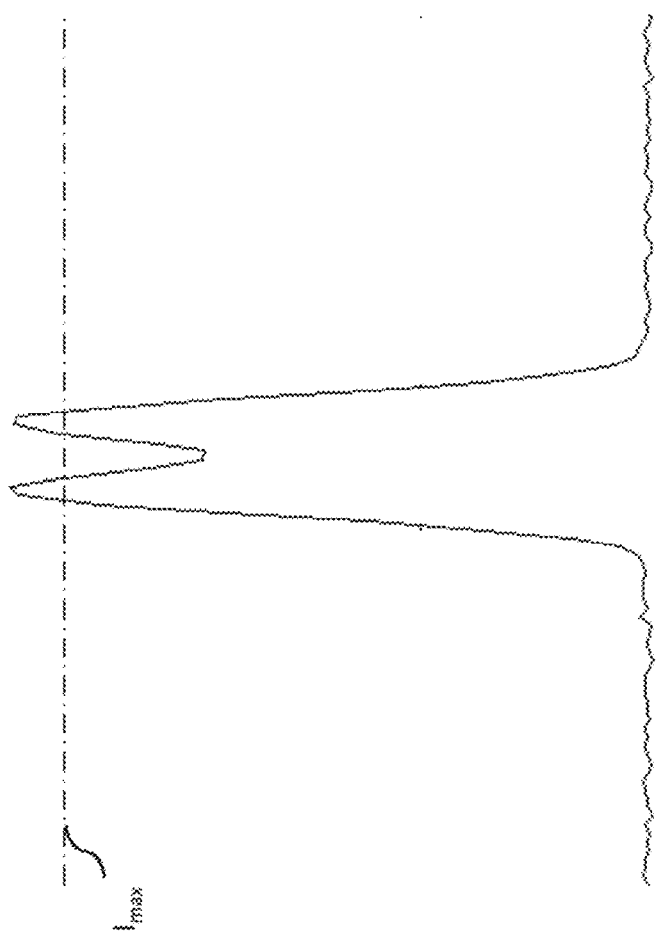

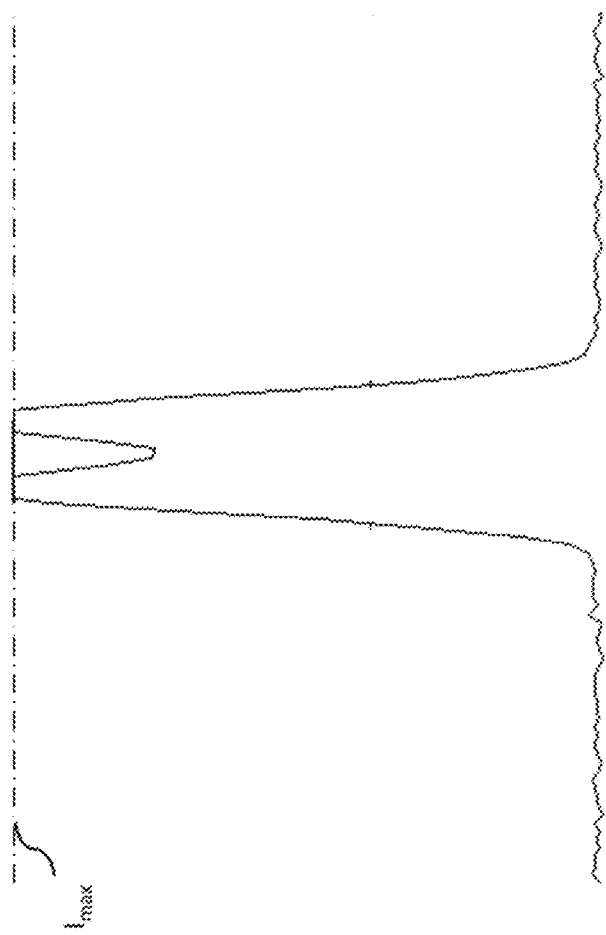

SYSTEMS AND METHODS FOR SPOOF DETECTION IN IRIS BASED BIOMETRIC SYSTEMS

FIELD OF INVENTION

The invention relates to systems and methods for obtaining and processing images of one or more features of a subject's eye for biometric recognition. The invention particularly relates to systems and methods which enable spoof detection (i.e. determining whether an iris imaged for biometric authentication purposes is authentic or counterfeit).

BACKGROUND

Methods for iris recognition implement pattern-recognition techniques to compare an acquired image of a subject's iris against a previously stored image of the subject's iris, and thereby determine or verify identity of the subject. A digital feature set corresponding to an acquired iris image is encoded based on the image, using mathematical or statistical algorithms. The digital feature set or template is compared with databases of previously encoded digital templates (stored feature sets corresponding to previously acquired iris images), for locating a match and determining or verifying identity of the subject.

Apparatuses for iris recognition typically comprise an imaging apparatus for capturing an image of the subject's iris(es) and an image processing apparatus for comparing the captured image against previously stored iris image information. The imaging apparatus and image processing apparatus may comprise separate devices, or may be combined within a single device.

Iris based biometric technologies are susceptible to spoofing attacks, in which faked images of an iris are passed off as a genuine iris presented for iris recognition. For example, certain iris-identification systems are susceptible to spoofing by high resolution printed images of a subject's eye or iris being presented to the iris camera for imaging and subsequent feature extraction and comparison.

Previously known methods of iris spoof detection (disclosed in U.S. Pat. No. 8,364,971) include one or more of (a) altering levels of illumination and observing effects of change in illumination intensity on the eye, (b) changing the position or pattern of LEDs providing illumination and observing differences in specular patterns reflected off the cornea of the eye, and (c) modifying an angle of illumination over successive images to change the level of reflectance from within the eye as seen through the pupil, commonly known as "red eye." Since all of the above involve varying levels of active illumination upon a subject's eye, such methods may result in user discomfort, and also present eye safety concerns in cases where intensity of illumination increases moves towards and beyond safety thresholds.

It is an objective of the present invention to provide safe and effective solutions for spoof detection in iris based biometric systems.

SUMMARY

The invention provides methods, systems and computer program products for spoof detection in iris based biometric recognition.

In a method embodiment, the invention comprises obtaining a first image of an iris at an imaging apparatus configured to a first exposure setting, and obtaining a second image of the iris at the imaging apparatus configured to a second exposure setting. The incidence of reflection patterns within the first and second iris images are compared, and authenticity of the imaged iris is determined based on a result of comparing the incidence of reflection patterns within the first and second iris images.

In an embodiment of the method, the first exposure setting defines a first exposure period for image acquisition by an image sensor, and the second exposure setting defines a second exposure period for image acquisition by the image sensor. The second exposure period may be shorter than the first exposure period.

In an embodiment of the method, a first imaging apparatus configuration for achieving the first exposure setting differs from a second imaging apparatus configuration for achieving the second exposure setting, in terms of one or both of a shutter speed setting or an integration time setting.

In a more specific embodiment, a first shutter speed setting corresponding to the first imaging apparatus configuration may implement a slower shutter speed than a second shutter speed corresponding to the second imaging apparatus configuration. In an alternative embodiment, a first integration time setting corresponding to the first imaging apparatus configuration may implement a longer integration time than a second integration time setting corresponding to the second imaging apparatus configuration.

The method of the present invention may determine an imaged iris to be authentic, responsive to ascertaining that variation between (i) a first set of image characteristics of a reflection detected in the first iris image and (ii) a second set of image characteristics of the same reflection detected in the second iris image, is consistent with a predicted variation in said first and second set of image characteristics.

In a particular method embodiment, responsive to (i) the first exposure setting defining a first exposure period for image acquisition by an image sensor (ii) the second exposure setting defining a second exposure period for image acquisition by the image sensor and (iii) and the second exposure period being shorter than the first exposure period, the predicted variation in the first and second set of image characteristics of a reflection comprises a prediction that a reflection imaged within the second iris image has any of (a) smaller size (b) lower intensity (c) lower incidence of pixel saturation, (d) lower incidence of pixel-saturation caused interference with a multi-peak irradiance profile, and (e) higher clarity, when compared to the same reflection detected within the first iris image.

In a method embodiment, an imaged iris is determined to be counterfeit, responsive to ascertaining that variation between (i) a first set of image characteristics of a reflection detected in the first iris image and (ii) a second set of image characteristics of the same reflection detected in the second iris image, is inconsistent with a predicted variation in said first and second set of image characteristics.

In another method embodiment, responsive to (i) the first exposure setting defining a first exposure period for image acquisition by an image sensor (ii) the second exposure setting defining a second exposure period for image acquisition by the image sensor and (iii) the second exposure period being shorter than the first exposure period, the predicted variation in the first and second set of image characteristics of a reflection comprises a prediction that the reflection imaged within the first iris image has any of has any of (i) larger size (ii) higher intensity (iii) higher incidence of pixel saturation, (iv) higher incidence of pixel-saturation caused interference with a multi-peak irradiance profile, and (v) lower clarity, when compared to the same reflection detected within the second iris image.

A method embodiment of the present invention may comprise the steps of (i) obtaining a first image of an iris at an imaging apparatus configured to a first exposure setting (ii) comparing iris information extracted from the first image with stored iris information corresponding to at least one iris (iii) responsive to a match decision resulting from the comparison between iris information corresponding to the first image and stored iris information corresponding to at least one iris, resulting in a match decision (a) obtaining a second image of the iris at the imaging apparatus configured to a second exposure setting, (b) comparing incidence of reflection patterns within the first and second iris images, (c) determining authenticity of the imaged iris based on a result of comparing incidence of reflection patterns within the first and second iris images and (d) granting an access authorization responsive to determining that the imaged iris is authentic.

The present invention additionally presents a system for spoof detection for iris based biometric recognition. In an embodiment, the system comprises an imaging apparatus comprising an image sensor, configured to obtain a first image of an iris at a first exposure setting and to obtain a second image of the iris at a second exposure setting. The system may additionally include a processor configured to compare incidence of reflection patterns within the first and second iris images and determine authenticity of the imaged iris based on a result of comparing the incidence of reflection patterns within the first and second iris images.

The imaging apparatus of the system may be configured such that the first exposure setting defines a first exposure period for image acquisition by an image sensor, and the second exposure setting defines a second exposure period for image acquisition by the image sensor. A first configuration of the imaging apparatus for achieving the first exposure setting may differ from a second configuration of the imaging apparatus for achieving the second exposure setting, in terms of one or both of a shutter speed setting or an integration time setting.

In a system embodiment, the processor may be configured to accept an imaged iris as genuine, responsive to determining that variation between (i) a first set of image characteristics of a reflection detected in the first iris image and (ii) a second set of image characteristics of the same reflection detected in the second iris image, is consistent with a predicted variation in said first and second set of image characteristics.

The processor may further be configured such that, responsive to (i) the first exposure setting defining a first exposure period for image acquisition by an image sensor (ii) the second exposure setting defining a second exposure period for image acquisition by the image sensor and (iii) the second exposure period being shorter than the first exposure period, the predicted variation in the first and second set of image characteristics of a reflection comprises a prediction that the reflection imaged within the second iris image has any of (i) smaller size (ii) lower intensity (iii) lower incidence of pixel saturation, (iv) lower incidence of pixel-saturation caused interference with a multi-peak irradiance profile, and (v) higher clarity, when compared to the same reflection detected within the first iris image.

The processor may additionally be configured to reject an imaged iris as counterfeit, responsive to ascertaining that variation between (i) a first set of image characteristics of a reflection detected in the first iris image and (ii) a second set of image characteristics of the same reflection detected in the second iris image, is inconsistent with a predicted variation in said first and second set of image characteristics.

In a system embodiment, the processor may be configured such that, responsive to (i) the first exposure setting defining a first exposure period for image acquisition by an image sensor (ii) the second exposure setting defining a second exposure period for image acquisition by the image sensor and (iii) the second exposure period being shorter than the first exposure period, the predicted variation in the first and second set of image characteristics of a reflection comprises a prediction that the reflection imaged within the first iris image has any of (i) larger size (ii) higher intensity (iii) higher incidence of pixel saturation, (iv) higher incidence of pixel-saturation caused interference with a multi-peak irradiance profile, and (v) lower clarity, when compared to the same reflection detected within the second iris image.

The invention also provides a computer program product for spoof detection for iris based biometric recognition, comprising a non-transitory computer usable medium having a computer readable program code embodied therein, the computer readable program code comprising instructions for obtaining a first image of an iris at an imaging apparatus configured to a first exposure setting and obtaining a second image of the iris at the imaging apparatus configured to a second exposure setting. The computer readable program code may further comprise comparing incidence of reflection patterns within the first and second iris images and determining authenticity of the imaged iris based on a result of comparing the incidence of reflection patterns within the first and second iris images.

BRIEF DESCRIPTION OF THE ACCOMPANYING DRAWINGS

FIG. 1A illustrates steps typically involved in iris image based recognition systems.

FIGS. 3 to 10 illustrate detectable variations in image characteristics corresponding to specular reflection patterns which arise as a consequence of changing an exposure period.

DETAILED DESCRIPTION

Figure 1B:
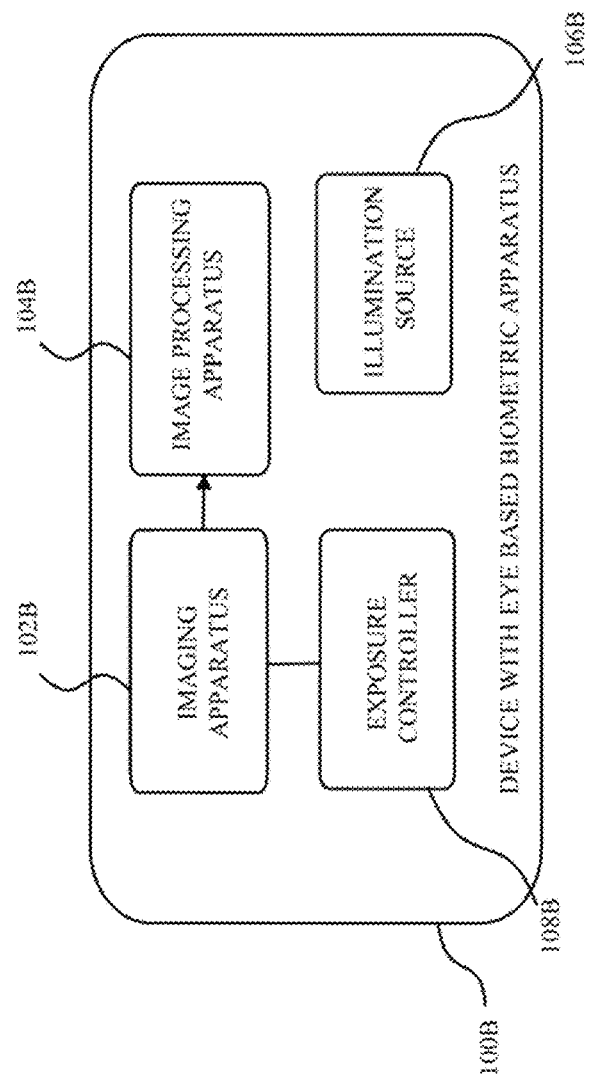
FIG. 1B is a functional block diagram of device incorporating an apparatus in accordance with the present invention.

FIG. 1A illustrates steps typically involved in iris image based recognition systems. At step 102A, the imaging apparatus acquires an image of the subject's iris.

Iris segmentation is performed on the acquired image at step 104A. Iris segmentation refers to the step of locating the inner and outer boundaries of the iris within the acquired image, and cropping the portion of the image which corresponds to the iris. Since the iris is annular in shape, iris segmentation typically involves identifying two substantially concentric circular boundaries within the acquired image—which circular boundaries correspond to the inner and outer boundaries of the iris. Several techniques for iris segmentation may be implemented to this end, including for example Daugman's iris segmentation algorithm. Iris segmentation may additionally include cropping of eyelids and eye lashes from the acquired image. It would be understood that iris segmentation is an optional step prior to feature extraction and comparison, that may be avoided entirely. Iris segmentation is at times understood to comprise a part of feature extraction operations, and is not always described separately.

Subsequently, feature extraction is performed at step 106A—comprising processing image data corresponding to the cropped iris image, to extract and encode salient and discriminatory features that represent an underlying biometric trait. For iris images, features may be extracted by applying digital filters to examine texture of the segmented iris images. Application of digital filters may result in a binarized output (also referred to as an "iris code" or "feature set") comprising a representation of salient and discriminatory features of the iris. Multiple techniques for iris feature extraction may be implemented, including by way of example, application of Gabor filters.

At step 108A, a comparison algorithm compares the feature set corresponding to the acquired iris image against previously stored iris image templates from a database, to generate scores that represent a difference (i.e. degree of similarity or dissimilarity) between the input image and the database templates. The comparison algorithm may for example involve calculation of a hamming distance between the features sets of two iris images, wherein the calculated normalized hamming distance represents a measure of dissimilarity between two irises.

The feature extraction and comparison steps may be integrated into a single step. Equally, the feature extraction step may be omitted entirely, in which case the feature comparison step may comprise comparing iris image information corresponding to the received frame, with stored iris information corresponding to at least one iris image. For the purposes of this invention, any references to the step of comparison shall be understood to apply equally to (i) comparison between a feature set derived from a feature extraction step and stored iris image templates, and (ii) comparison performed by comparing iris image information corresponding to the received frame, with stored iris information corresponding to at least one iris image.

At step 110A, results of the comparison step are used to arrive at a decision (identity decision) regarding identity of the acquired iris image.

For the purposes of this specification, an identity decision may comprise either a positive decision or a negative decision. A positive decision (a "match" or "match decision") comprises a determination that the acquired iris image (i) matches an iris image or iris template already registered or enrolled within the system or (ii) satisfies a predetermined degree of similarity with an iris image or iris template already registered or enrolled within the system. A negative decision (a "non-match" or "non-match decision") comprises a determination that the acquired iris image (i) does not match any iris image or iris template already registered or enrolled within the system or (ii) does not satisfy a predetermined degree of similarity with any iris image or iris template registered or enrolled within the system. In embodiments where a match (or a non-match) relies on satisfaction (or failure to satisfy) a predetermined degree of similarity with iris images or iris templates registered or enrolled within the system—the predetermined degree of similarity may be varied depending on the application and requirements for accuracy. In certain electronic devices (e.g. mobile devices) validation of an identity could result in unlocking of, access authorization or consent for the electronic device or its communications, while failure to recognize an iris image could result in refusal to unlock or refusal to allow access. In an embodiment of the invention, the match (or non-match) determination may be communicated to another device or apparatus which may be configured to authorize or deny a transaction, or to authorize or deny access to a device, apparatus, premises or information, in response to the communicated determination.

The present invention presents systems and methods for spoof detection based on detected changes in reflection patterns (such as surface glare or specular reflection patterns) on a surface of an imaged eye, measured over a plurality of successive images. With a view to avoid having to vary intensity of illumination that is incident upon a subject's eye, the present invention instead relies on varying exposure parameters within an iris imaging apparatus, for spoof detection purposes.

In photography, "exposure" refers to the amount of light per unit area reaching an imaging surface such as a photographic film (in case of film based cameras) or an image sensor (in case of digital cameras). Exposure of the imaging surface may be determined by shutter speed, or integration time, or both, which determine a finite time period in which an imaging surface is exposed to incident wavelengths for the purpose of image acquisition ("Exposure period").

"Shutter speed" refers to the length of time a camera's shutter is open during image acquisition—and determines the amount of light that reaches the photographic film or image sensor within the camera.

In digital cameras, an exposure period may also be determined by "integration time"—which refers to a finite period of time during which photosensitive elements within the image sensor are permitted to either accumulate charge (in the case of CCD image sensors) or to allow charge to drain (in the case of CMOS image sensors), in response to incident wavelengths. At the end of the integration time, charge accumulated or remaining in each photosensitive element is read and digitized for the purpose of generating image information.

Digital cameras may control one or both of shutter speed and integration time for the purpose of controlling exposure period of the imaging apparatus.

It would be understood that controlling exposure of an imaging apparatus correspondingly controls intensity of illumination detected at the imaging surface. The present invention exploits this by using exposure control as a means for iris spoof detection.

FIG. 1B is a functional block diagram of a device 100B having an apparatus in accordance with the present invention, configured for eye based biometric recognition (e.g. iris or retina based biometric recognition), the device including an imaging apparatus 102B and an image processing apparatus 104B. Imaging apparatus 102B includes an image sensor for acquiring an image of the subject's eye and transmits the image to image processing apparatus 104B. The image captured by imaging apparatus 102B may be a still image or a video image. Image processing apparatus 104B thereafter analyses and compares data extracted from the captured image of the subject's eye/iris against data extracted from previously acquired eye/iris images, to identify the subject, or to verify the identity of the subject. Device 100B additionally includes an illumination source 106B (for example an incandescent light source, an IR or NIR spectrum illumination source or any other illumination source) and an exposure controller 108B configured to control exposure period of the imaging apparatus. Exposure controller 108B may control the exposure period by varying one or both of shutter speed of the imaging apparatus or integration time of the image sensor or both. Although not illustrated in FIG. 1, device 100B may include other components, including one or more optical assemblies, and components for extracting still frames from video images, for processing and digitizing image data, and for enabling communication between components of the apparatus.

Figure 2:
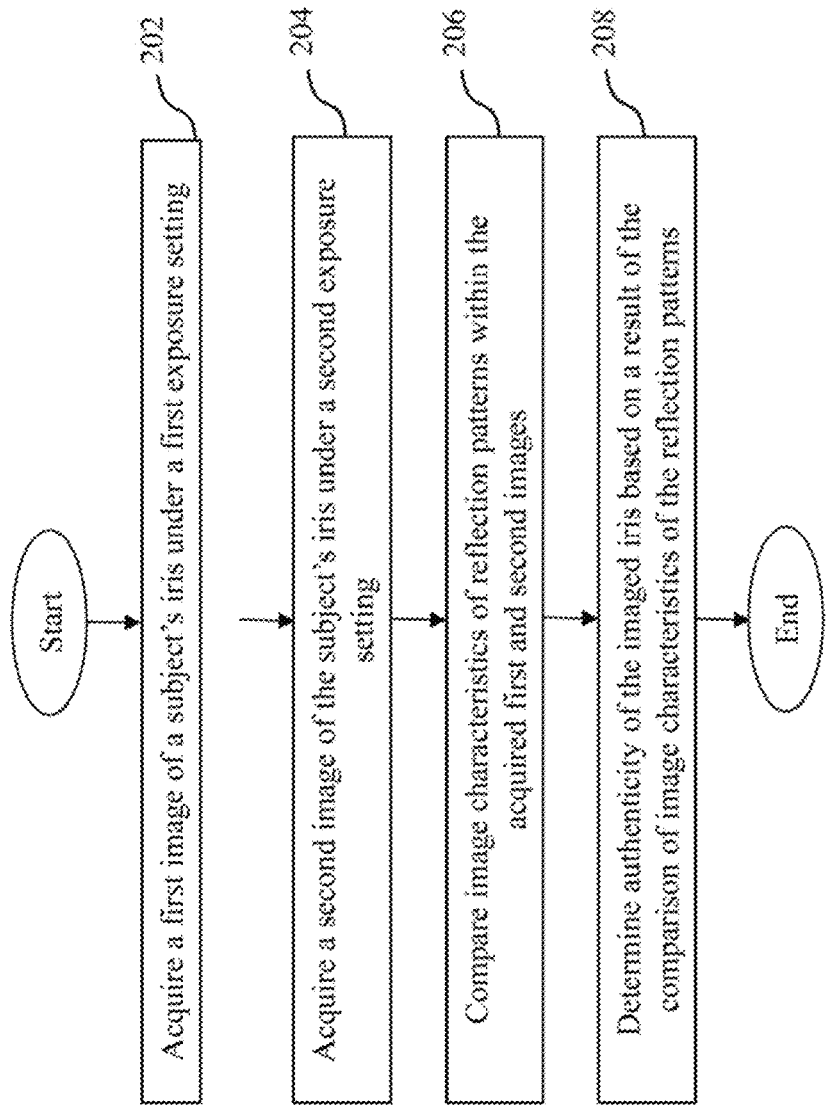
FIG. 2 illustrates a method of iris spoof detection.

FIG. 2 illustrates a method of iris spoof detection in accordance with the present invention.

Step 202 comprises acquiring a first image of a subject's iris at an imaging apparatus configured to a first exposure setting—which first exposure setting defines a first exposure period for image acquisition by an image sensor within the imaging apparatus. Step 204 comprises acquiring a second image of the subject's iris at the imaging apparatus configured to a second exposure setting—which second exposure setting defines a second exposure period for image acquisition by the image sensor. In an embodiment of the invention, the second exposure period may be shorter the first exposure period. In another embodiment, the second exposure period may be longer than the first exposure period.

The first imaging apparatus configuration for achieving the first exposure setting may differ from the second imaging apparatus configuration for achieving the second exposure setting, in terms of one or both of a shutter speed setting or an integration time setting. In an embodiment, a first shutter speed setting corresponding to the first imaging apparatus configuration may implement a slower shutter speed than a second shutter speed corresponding to the second imaging apparatus configuration. In another embodiment, a first integration time setting corresponding to the first imaging apparatus configuration may implement a longer time than a second integration time setting corresponding to the second imaging apparatus configuration.

At step 206, the method compares image characteristics of one or more reflection patterns detected within the acquired first and second images. The reflection patterns detected within the acquired first and second images may include reflections caused by glare or specular reflections off a subject's cornea, iris, or any other part of the imaged eye.

As stated previously, controlling exposure of an imaging apparatus correspondingly controls intensity of illumination detected at the imaging surface. When considered specifically in connection with reflection patterns detected in iris images (and assuming that all other factors, including position of the iris and position and intensity of an illumination source remain the same or substantially the same), a first iris image acquired through a long exposure period would include a first set of reflection patterns having a corresponding first set of image characteristics, and a second iris image acquired through a short exposure period would include a second set of reflection patterns having a corresponding second set of image characteristics, such that the second set of image characteristics are different from the first set of image characteristics. An analysis of identified differences between the first and second set of image characteristics corresponding respectively to the first and second sets of reflection patterns may be used to determine whether the iris presented for imaging is authentic or counterfeit. In an embodiment of the method of FIG. 2, image characteristics (corresponding to first and second sets of reflection patterns respectively within the acquired first and second images) that form the basis for comparison at step 206 may include any detected image characteristics including but not limited to appearance, size, clarity, shape, pattern, absolute or relative position, characteristics of component reflections within a reflection pattern, detected irradiance profile information, or intensity of a reflection.

Step 208 comprises determining authenticity of the imaged iris (i.e. whether the iris presented for imaging is genuine or counterfeit), which determination is based on results of the comparison at step 206. The determination of authenticity comprises (i) determining a variation between a first set of image characteristics of a reflection detected in the first iris image and a second set of image characteristics of the same reflection detected in the second iris image and (ii) ascertaining whether the detected variation is consistent with a variation predicted to occur in said first and second set of image characteristics as a consequence of changing the imaging apparatus configuration from the first exposure setting to the second exposure setting.

Specifically, a determination that the iris presented for imaging is a spoof or counterfeit may be arrived at in situations where a determined or observed variation in image characteristics of a reflection pattern(s) in first and second images is not consistent with a variation predicted to occur as a consequence of changing the imaging apparatus configuration from the first exposure setting to the second exposure setting. Conversely, a determination that the iris presented for imaging is authentic may be arrived at in situations where a determined variation in image characteristics of reflection pattern(s) in the first and second images is consistent with a variation predicted to occur as a consequence of changing the imaging apparatus configuration from the first exposure setting to the second exposure setting.

For example, in the case where a first exposure configuration ensures a first exposure period and a second exposure configuration ensures a second exposure period that is shorter than the first exposure period, a reflection detected within the first iris image may in an embodiment of the invention be expected to exhibit one or more of (i) a larger size (ii) a higher intensity (iii) increased pixel saturation, (iv) higher incidence of pixel saturation caused interference with a multi-peak irradiance profile, and (v) lower clarity, when compared with the same reflection detected within the second iris image. If at comparison step 206, it is found that a reflection detected within the first iris image exhibits one or more of the above characteristics in comparison to the same reflection detected within the second iris image, the iris presented for imaging is determined to be genuine. If on the other hand at step 206, it is found that the reflection detected within the first iris image exhibits one or more of (i) same or smaller size (ii) same or lower intensity (iii) same or lower incidence of pixel saturation, (iv) the same or lower incidence of pixel saturation caused interference with a multi-peak irradiance profile, and (v) same or higher clarity, when compared to the same reflection detected within the second iris image, the iris presented for imaging is determined to be a spoof or counterfeit.

Conversely, in the case where the first exposure configuration ensures a first exposure period and the second exposure configuration ensures a second exposure period that is longer that the first exposure period, a reflection detected within the first iris image would be expected to exhibit one or more of (i) smaller size (ii) lower intensity (iii) lower incidence of saturation, (iv) the same or lower incidence of pixel saturation caused interference with a multi-peak irradiance profile and (v) higher clarity, when compared with the same reflection detected within the second iris image. If at comparison step 206, it is found that a reflection detected within the first iris image actually exhibits one or more of (i) smaller size (ii) lower intensity (iii) lower incidence of pixel saturation, (iv) the same or lower incidence of pixel saturation caused interference with a multi-peak irradiance profile, and (v) higher clarity when compared with the same reflection detected within the second iris image, the iris presented for imaging is determined to be genuine. If on the other hand at step 206, it is found that the reflection detected within the first iris image exhibits one or more (i) the same or a larger size (ii) the same or a higher intensity (iii) the same or higher incidence of pixel saturation, (iv) higher pixel saturation caused interference with a multi-peak irradiance profile and (v) the same or lower clarity, when compared with the same reflection detected within the second iris image, the iris presented for imaging is determined to be a spoof or counterfeit.

It will be understood that characteristics of size, intensity, incidence of pixel saturation, incidence of pixel saturation caused interference with a multi-peak irradiance profile, and clarity do not comprise an exhaustive enumeration of image characteristics affected by variations in exposure period. Other exemplary non-limiting image characteristics may include absolute or relative position of a detected reflection and characteristics of component reflections within a reflection.

FIGS. 3 to 10 illustrate exemplary embodiments of detectable variations in image characteristics corresponding to specular reflection patterns which arise as a consequence of changing an exposure period, and which may be used to determine whether the iris presented for imaging is a spoof or counterfeit in accordance with the method of FIG. 2.

Figure 3:
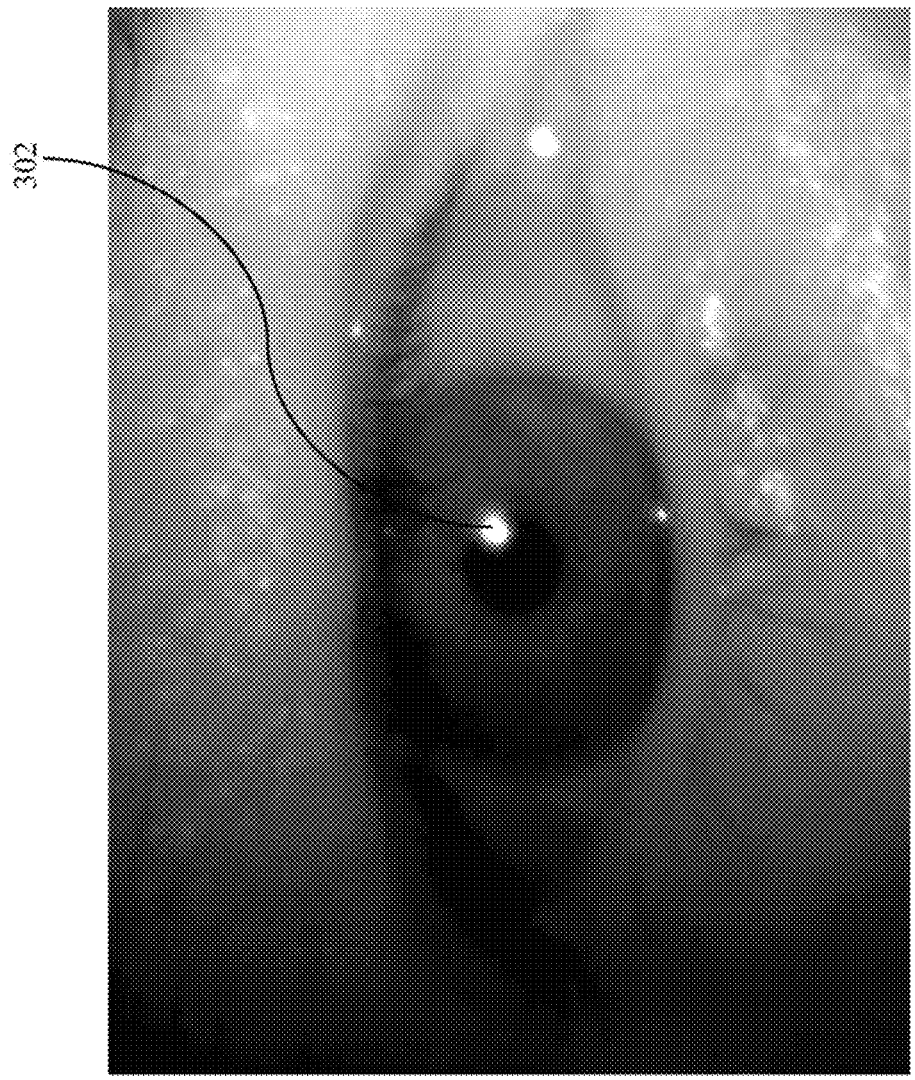
Figure 4:
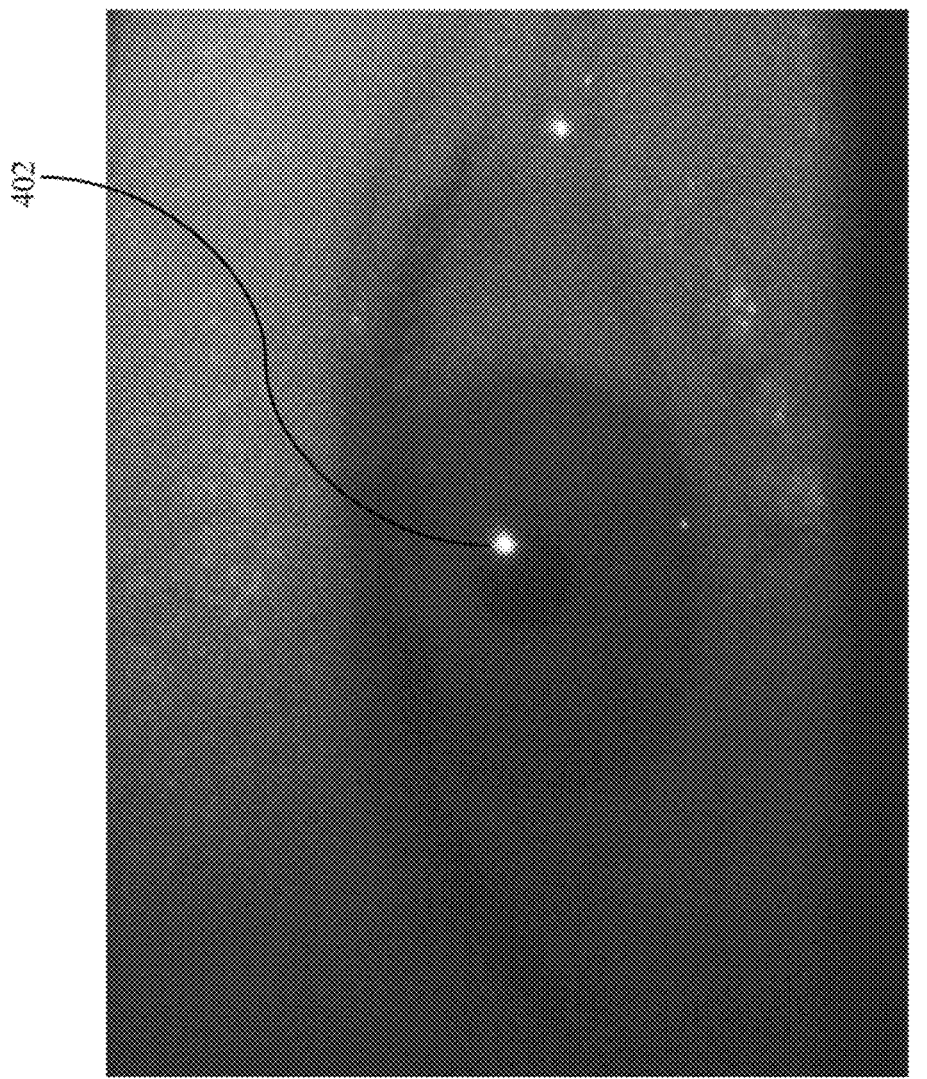

FIGS. 3 and 4 respectively comprise a first image 301 and a second image 401 of a genuine eye (i.e. an authentic human eye positioned in front of an imaging apparatus for image acquisition), both of which images are acquired using the same imaging apparatus, but under different exposure periods. Specifically, a first exposure period in which first image 301 of FIG. 3 was acquired by the imaging apparatus was longer than a second exposure period in which the second image 401 of FIG. 4 was acquired. It will be observed that while each of first image 301 and second image 401 of the subject's eye respectively include a specular reflection (primary specular reflection) 302 and 402 in the vicinity of the iris-pupil boundary, size and intensity characteristics of said primary specular reflection 302 within first image 301 are different from the corresponding size and intensity characteristics of the primary specular reflection 402 within second image 401.

Figure 5:
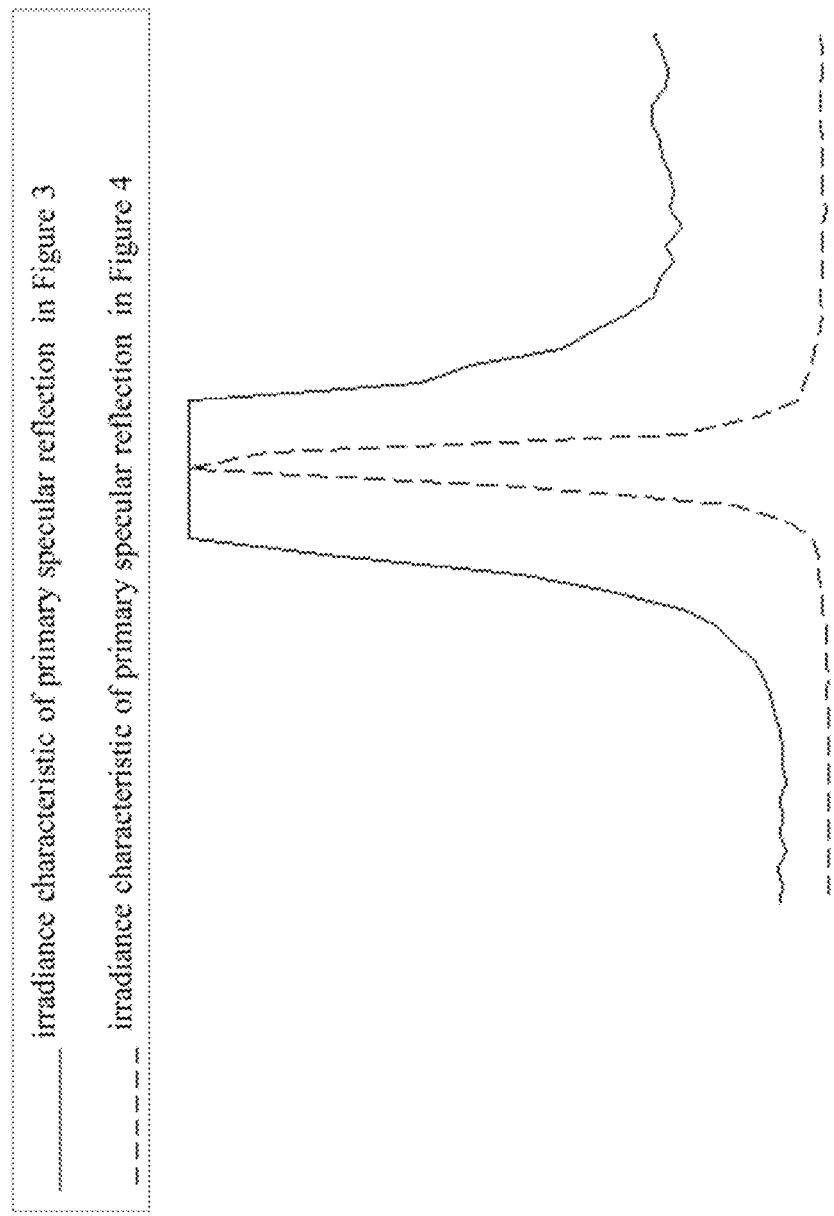

FIG. 5 illustrates irradiance profiles corresponding to (i) primary specular reflection 302 within first image 301 of FIG. 3, and (ii) primary specular reflection 402 within second image 401 of FIG. 4. The comparative plot of FIG. 5 illustrates an observed variation in irradiance profiles of the primary specular reflection patterns 302 and 402 when images of a genuine or authentic iris are acquired under differing exposure periods.

Figure 6:
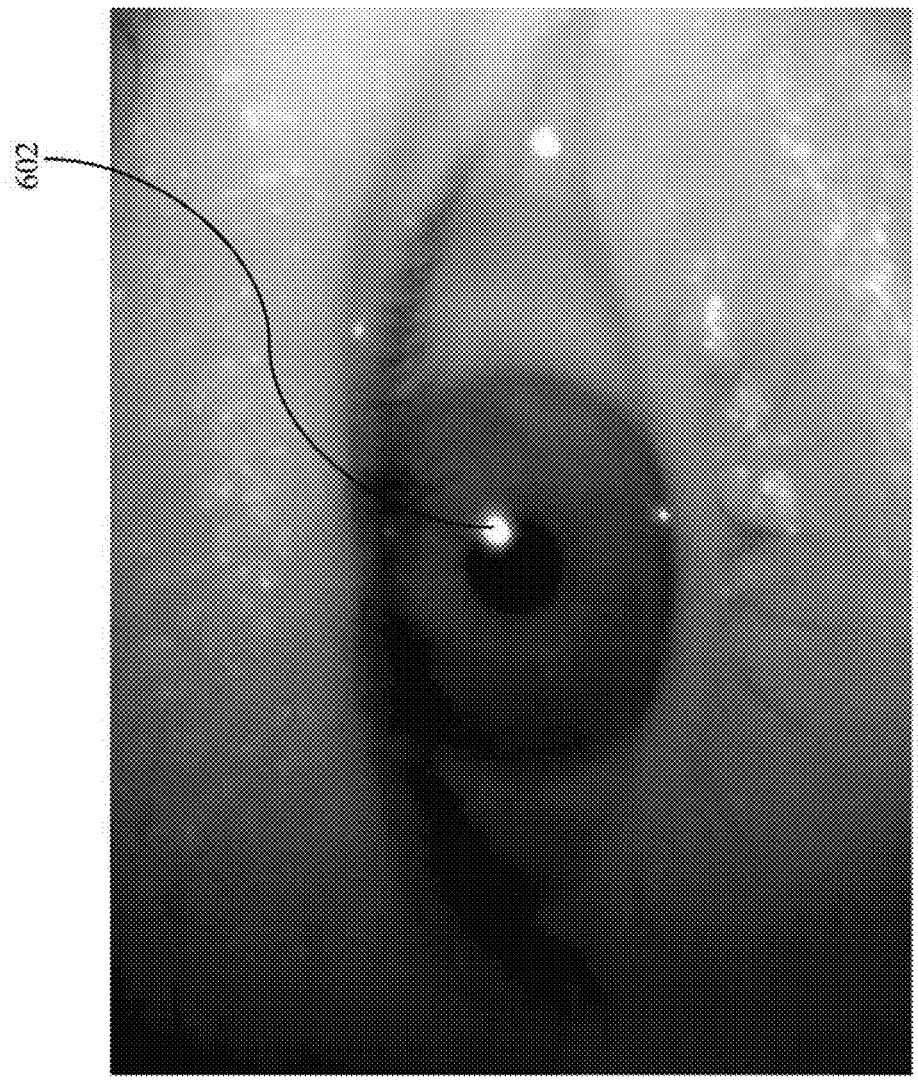
Figure 7:
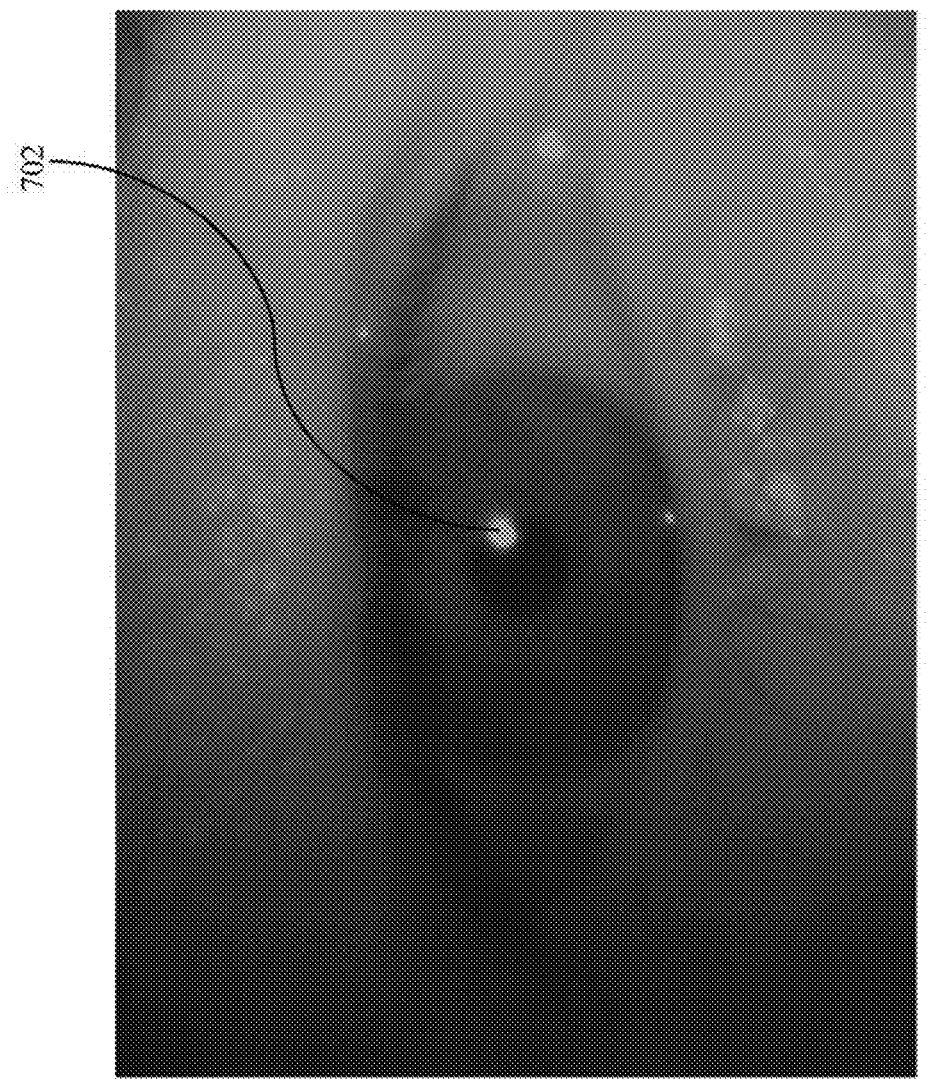

FIGS. 6 and 7 respectively comprise a first image 601 and a second image 701 of a fake or counterfeit eye (e.g. an image of a subject's eye printed on paper and positioned in front of an imaging apparatus for image acquisition), acquired using the same imaging apparatus, but under different exposure periods. Specifically a first exposure period in which the first image 601 of FIG. 6 was acquired by the imaging apparatus was longer than a second exposure period in which the second image 701 of FIG. 7 was acquired. It will be observed that each of the first image 601 and the second image 701 of the counterfeit eye respectively include a specular reflection (primary specular reflection) 602 and 702 in the vicinity of the iris-pupil boundary.

FIG. 8 illustrates irradiance profiles corresponding to (i) the primary specular 602 reflection within first image 601 of FIG. 6 and (ii) the primary specular reflection 702 within second image 701 of FIG. 7. The comparative plot of FIG. 8 illustrates an observed variation in irradiance profile characteristics of the primary specular reflection patterns 602 and 702 when images of a counterfeit eye are acquired under differing exposure periods.

Comparing the respective plots of FIGS. 5 and 8, it can be seen that the type of variations in specular irradiance profile characteristics arising from image capture of a genuine eye using two different exposure periods is significantly different from the type of variations in specular reflection irradiance profile characteristics arising from image capture of a fake eye using two different exposure periods. In an embodiment of the method discussed in connection with FIG. 2, the invention ascertains whether an eye or iris presented for image acquisition is genuine or fake, by acquiring at least two images of the eye or iris under at least two different exposure periods, and comparing the observed variation in image characteristics of the detected specular reflections against a variation that is expected or predicted when (i) images of a genuine eye are acquired under the same at least two different exposure periods or (ii) images of a fake eye are acquired under the same at least two different exposure periods.

FIG. 9A illustrates an irradiance profile corresponding to a reflection caused by a light source that is not a "point light source" (e.g. an illumination source having two or more LEDs such as in an LED array or in a multi-chip LED package). Instead of having a single peak, the detected irradiance profile comprises a modulated (or multi-peak) irradiance profile, which in FIG. 9A comprises a twin peak irradiance profile.

It will be understood that the maximum irradiance $I_{max}$ capable of being recorded or detected by pixels of an image sensor determines the radiation intensity at which pixels of the image sensor achieve saturation (i.e. the saturation level)—beyond which saturation level, pixels of the image sensor are incapable of providing direct information regarding incident radiation, and can only indicate that such pixels have been subjected to irradiance having intensity at least equal to $I_{max}$.

Accordingly, as illustrated in the irradiance profile of FIG. 9B, an image sensor would only be able to detect irradiance information upto intensity levels equal to $I_{max}$—beyond which pixels of the image sensor achieve saturation, which interferes with detecting and recording irradiation information corresponding to the tips of the twin peak configuration illustrated in FIG. 9A. As a consequence, the irradiance profile of FIG. 9B does not reflect the twin peak configuration of FIG. 9A, and instead illustrates a plateau region at saturation level $I_{max}$—thereby indicating that the pixels have been subjected to a radiation intensity at least equal to $I_{max}$.

In case of reflections caused by multi-point sources of light, the variations in detected and recorded irradiance profile information (including with respect to incidence of pixel saturation caused interference with a multi-peak irradiance profile) caused by changing exposure periods, can in an embodiment be used to ascertain whether an iris or eye presented for image acquisition is genuine or fake.

Figure 10:
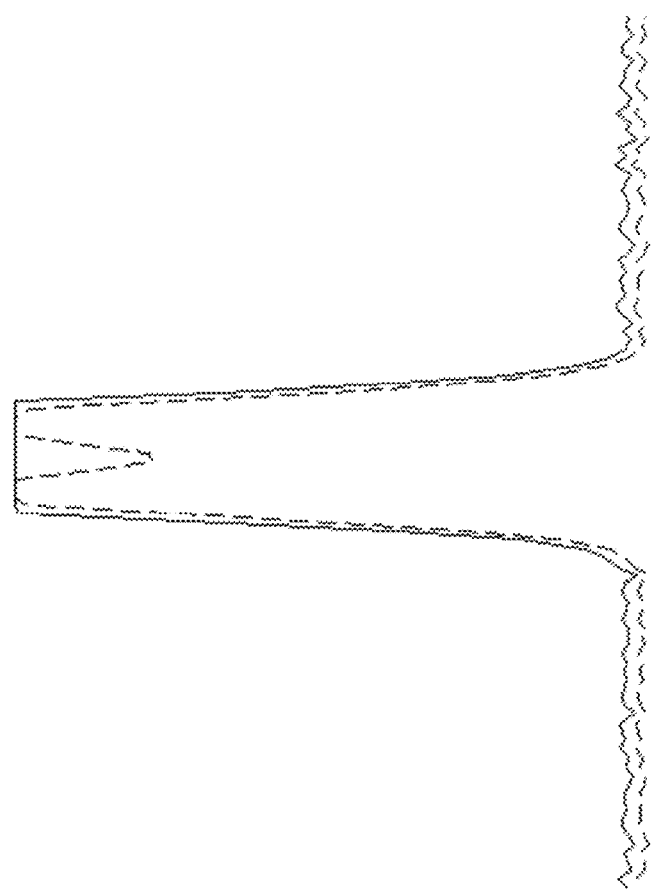

FIG. 10 illustrates the variations in detected or recorded multi-peak irradiance profiles (caused by multi-point sources of light) responsive to variations in exposure period. As shown in the comparative plot of FIG. 10, in case of images acquired under a longer exposure period, the maximum intensity of irradiance caused by a specular reflection may exceed the saturation level of image sensor pixels, thereby preventing the multiple peaks or the irradiance profile from being detected and recorded by the image sensor. In contrast, when an image is acquired under a shorter exposure period, the maximum intensity of irradiance caused by a specular reflection may be less than the saturation level of the image sensor pixels—and as a consequence, the image sensor pixels are able to detect and record the multiple peaks of the irradiance profile.

Accordingly, in an embodiment of the invention where the illumination source is a multi-point illumination source capable of causing specular reflections having a multi-peak irradiance profile, an anticipated or predicted variation between irradiance profiles respectively detected under a long exposure period and a short exposure period may be compared with an actual determined variation, to ascertain whether an eye or iris presented for imaging is authentic or counterfeit. In an embodiment of the invention, an eye or iris presented for imaging may be treated as genuine, if pixel saturation caused interference with a multi-peak irradiance profile in case of a short exposure period is less than pixel saturation caused interference with a multi-peak irradiance profile in case of a long exposure period. In an embodiment of the invention, an eye or iris presented for imaging may be treated as fake, if pixel saturation caused interference with a multi-peak irradiance profile in case of a short exposure period is greater than or the same as pixel saturation caused interference with a multi-peak irradiance profile in case of a long exposure period.

Pursuant to the above, an exemplary rule based determination for authenticity of an iris presented for imaging is summarized in the table below.

| S No. | Configuration | Predicted Variation Between Image Characteristics of Reflection Pattern(s) Within First and Second Iris Images | Observed Variation Between Reflection Patterns First and Second Images | Rule Based Determination |
|---|---|---|---|---|
| 1. | First exposure period determined by the first exposure setting is longer than the second exposure period determined by the second exposure setting | A reflection detected within the first iris image acquired at the first exposure setting is predicted to exhibit any one or more of (i) a larger size (ii) a higher intensity (iii) increased pixel saturation, (iv) higher incidence of pixel saturation caused interference with a multi-peak irradiance profile, and (v) lower clarity, in comparison with the same reflection detected within a second iris image acquired at the second exposure setting | A reflection detected within the first iris image acquired at the first exposure setting is observed to exhibit any one or more of (i) a larger size (ii) a higher intensity (iii) increased pixel saturation, (iv) higher incidence of pixel saturation caused interference with a multi-peak irradiance profile, and (v) lower clarity, in comparison with the same reflection detected within a second iris image acquired at the second exposure setting | Genuine iris |
|  |  |  | A reflection detected within the first iris image acquired at the first exposure setting is observed to exhibit any one or more of (i) same or smaller size (ii) same or lower intensity (iii) same or lower incidence of pixel saturation, (iv) the same or lower incidence of pixel saturation caused interference with a multi-peak irradiance profile, and (v) same or higher clarity, in comparison with the same reflection detected within a second iris image acquired at the second exposure setting | Fake iris |

In addition to the image characteristics described in the above exemplary rule based determination, it would be understood that the invention may equally rely on comparisons between determined and predicted variations in any other image characteristics likely to show a predictable variation response to a change in exposure period.

Figure 11:
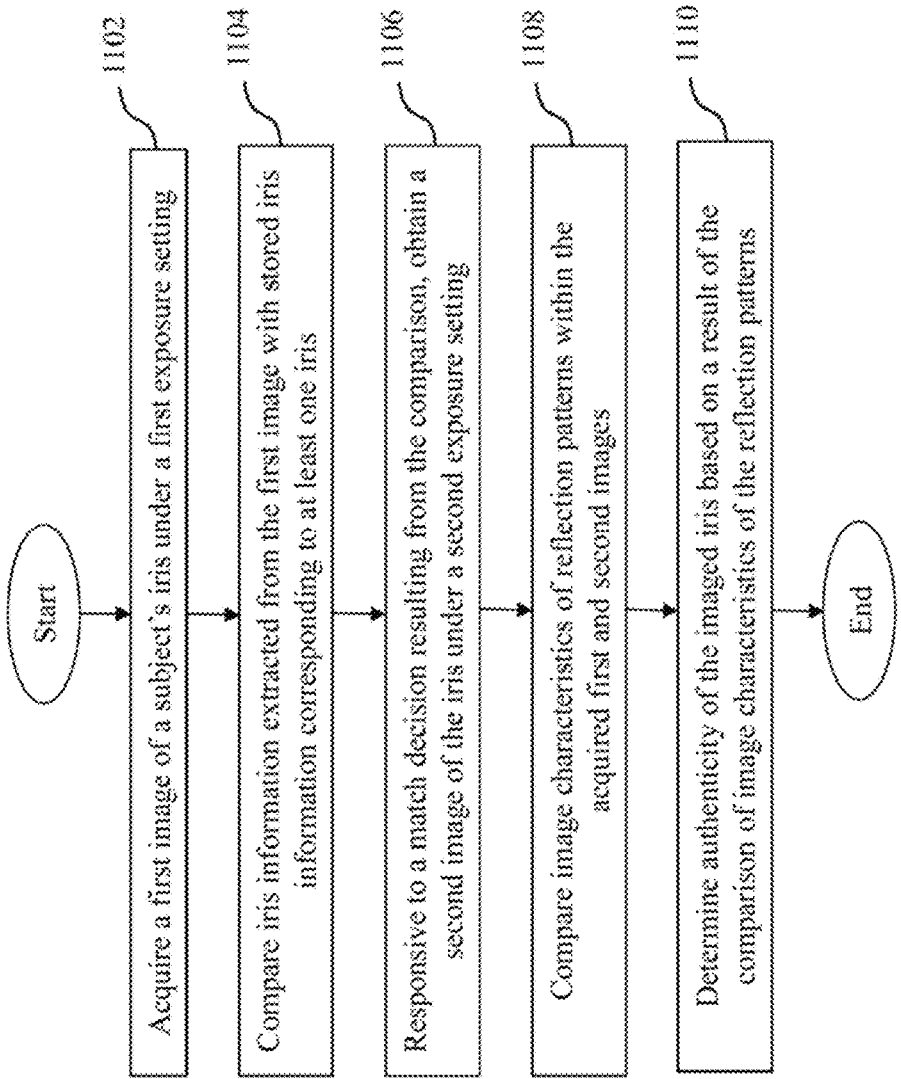
FIG. 11 illustrates implementation of a method for determining authenticity of an iris image, within a method for iris based biometric recognition.

FIG. 11 illustrates an exemplary method, wherein the method for determining authenticity of an iris presented for imaging is implemented within a method for iris based biometric recognition.

Step 1102 comprises acquiring a first image of a subject's iris under a first exposure setting. At step 1104, the method compares iris information extracted from the first image with stored iris information corresponding to at least one iris. Although not specifically illustrated in FIG. 11, it would be understood that method step 1104 may include any one or more steps related to methodologies for iris recognition that are discussed above in connection with FIG. 1A.

At step 1106, responsive to a match decision resulting from any of the comparisons executed at step 1104, a second image of the iris is obtained under a second exposure setting. Step 1108 thereafter compares image characteristics of reflection patterns within the acquired first and second images of the iris. At step 1110, authenticity of the imaged iris may be determined based on results of the comparison of image characteristics of reflection patterns within the first and second iris images. It will be understood that comparison step 1108 and authentication step 1110 may each be implemented in accordance with the comparison authentication steps 206 and 208 as previously described in connection with FIG. 2.

In an embodiment of the invention, the method of FIG. 11 may result in an access authorization responsive to (i) step 1104 resulting in a match decision (or validation of a subject's identity) and (ii) step 1110 resulting in validation of authenticity of the imaged iris (i.e. resulting in a determination that the imaged iris is authentic). Access authorization may include one or more of, unlocking an electronic device or any other system, apparatus or device, or authorizing access to any system, device, apparatus, or environment which implements iris based biometric access authorization control. Conversely, the method of FIG. 11 may result in denial of access, responsive to either (i) step 1104 not resulting in a match decision (or validation of a subject's identity) or (ii) step 1110 not resulting in validation of authenticity of the imaged iris.

Figure 12:
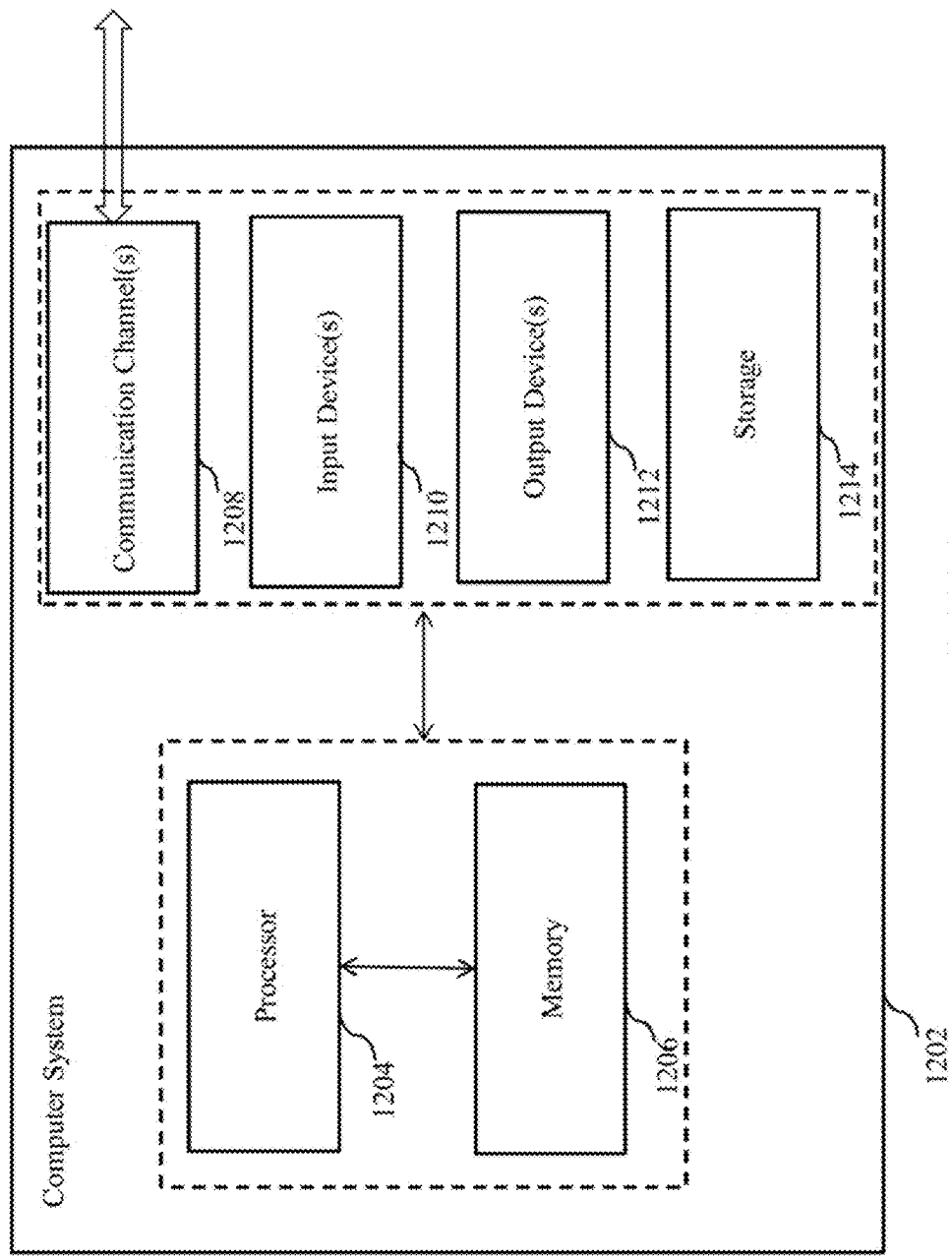
FIG. 12 illustrates an exemplary system in according to the present invention.

FIG. 12 illustrates an exemplary system in which various embodiments of the invention, including of the imaging apparatus, image processing apparatus and display, may be implemented. It would be understood that the exemplary system of FIG. 12 may in various embodiments either include or be included within the biometric recognition device illustrated in FIG. 1B.

The system 1202 comprises at-least one processor 1204 and at-least one memory 1206. The processor 1204 executes program instructions and may be a real processor. The processor 1204 may also be a virtual processor. The computer system 1202 is not intended to suggest any limitation as to scope of use or functionality of described embodiments. For example, the computer system 1202 may include, but not limited to, one or more of a general-purpose computer, a programmed microprocessor, a micro-controller, an integrated circuit, and other devices or arrangements of devices that are capable of implementing the steps that constitute the method of the present invention. In an embodiment of the present invention, the memory 1206 may store software for implementing various embodiments of the present invention. The computer system 1202 may have additional components. For example, the computer system 1202 includes one or more communication channels 1208, one or more input devices 1210, one or more output devices 1212, and storage 1214. An interconnection mechanism (not shown) such as a bus, controller, or network, interconnects the components of the computer system 1202. In various embodiments of the present invention, operating system software (not shown) provides an operating environment for various softwares executing in the computer system 1202, and manages different functionalities of the components of the computer system 1202.

The communication channel(s) 1208 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 1210 may include, but not limited to, a touch screen, a keyboard, mouse, pen, joystick, trackball, a voice device, a scanning device, or any another device that is capable of providing input to the computer system 1202. In an embodiment of the present invention, the input device(s) 1210 may be a sound card or similar device that accepts audio input in analog or digital form. The output device(s) 1212 may include, but not limited to, a user interface on CRT or LCD, printer, speaker, CD/DVD writer, or any other device that provides output from the computer system 1202.

The storage 1214 may include, but not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1202. In various embodiments of the present invention, the storage 1214 contains program instructions for implementing the described embodiments.

In an embodiment of the present invention, the computer system 1202 is part of a distributed network where various embodiments of the present invention are implemented for rapidly developing end-to-end software applications.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1202. The method described herein is typically implemented as a computer program product, comprising a set of program instructions which is executed by the computer system 1202 or any other similar device. The set of program instructions may be a series of computer readable codes stored on a tangible medium, such as a computer readable storage medium (storage 1214), for example, diskette, CD-ROM, ROM, flash drives or hard disk, or transmittable to the computer system 1202, via a modem or other interface device, over either a tangible medium, including but not limited to optical or analogue communications channel(s) 1208. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for spoof detection for iris based biometric recognition, the method comprising:
    obtaining a first image of an iris at an imaging apparatus using a first exposure period;
    obtaining a second image of the iris at the imaging apparatus using a second exposure period;
    comparing incidence of reflection patterns within the first and second iris images; and
    determining authenticity of the imaged iris based on a result of comparing the incidence of reflection patterns within the first and second iris images;
    wherein an imaged iris is determined to be authentic responsive to:
        (a) the second exposure period being shorter than the first exposure period;
        (b) the first and second iris images being obtained without varying illumination intensity incident upon the imaged iris; and
        (c) a reflection imaged within the second iris image having any of (i) smaller size (ii) lower intensity (iii) lower incidence of pixel saturation, (iv) lower incidence of pixel-saturation caused interference with a multi-peak irradiance profile, and (v) higher clarity, when compared to the same reflection detected within the first iris image.

2. The method of claim 1, wherein a first imaging apparatus configuration for achieving the first exposure period differs from a second imaging apparatus configuration for achieving the second exposure period, in terms of one or both of a shutter speed setting or an integration time setting.

3. The method of claim 2, wherein a first shutter speed setting corresponding to the first imaging apparatus configuration implements a slower shutter speed than a second shutter speed corresponding to the second imaging apparatus configuration.

4. The method of claim 2, wherein a first integration time setting corresponding to the first imaging apparatus configuration implements a longer integration time than a second integration time setting corresponding to the second imaging apparatus configuration.

5. The method of claim 1, wherein an imaged iris is determined to be counterfeit, responsive to ascertaining that variation between
    (i) a first set of image characteristics of a reflection detected in the first iris image; and
    (ii) a second set of image characteristics of the same reflection detected in the second iris image,
    is inconsistent with a predicted variation in said first and second set of image characteristics.

6. The method of claim 5, wherein determining that the imaged iris is counterfeit is based on:
    the predicted variation in the first and second set of image characteristics of a reflection comprising a prediction that the reflection imaged within the first iris image has any of (i) larger size (ii) higher intensity (iii) higher incidence of pixel saturation, (iv) higher incidence of pixel-saturation caused interference with a multi-peak irradiance profile, and (v) lower clarity, when compared to the same reflection detected within the second iris image.

7. A method for iris based biometric recognition, comprising the steps of:
    obtaining a first image of an iris at an imaging apparatus using a first exposure period;
    comparing iris information extracted from the first image with stored iris information corresponding to at least one iris;
    responsive to a match decision resulting from the comparison between iris information corresponding to the first image and stored iris information corresponding to at least one iris, resulting in a match decision:
        obtaining a second image of the iris at the imaging apparatus using a second exposure period;
        comparing incidence of reflection patterns within the first and second iris images;
        determining authenticity of the imaged iris based on a result of comparing incidence of reflection patterns within the first and second iris images; and
        granting an access authorization responsive to determining that the imaged iris is authentic;
    wherein an imaged iris is determined to be authentic responsive to:
        (a) the second exposure period being shorter than the first exposure period;
        (b) the first and second iris images being obtained without varying illumination intensity incident upon the imaged iris; and
        (c) a reflection imaged within the second iris image having any of (i) smaller size (ii) lower intensity (iii) lower incidence of pixel saturation, (iv) lower incidence of pixel-saturation caused interference with a multi-peak irradiance profile, and (v) higher clarity, when compared to the same reflection detected within the first iris image.

8. A system for spoof detection for iris based biometric recognition, comprising:
    an imaging apparatus comprising an image sensor, configured to:
        obtain a first image of an iris using a first exposure period; and
        obtain a second image of the iris using a second exposure period;
    a processor configured to:
        compare incidence of reflection patterns within the first and second iris images;
        determine authenticity of the imaged iris based on a result of comparing the incidence of reflection patterns within the first and second iris images;
    wherein an imaged iris is determined to be authentic responsive to:
        (a) the second exposure period being shorter than the first exposure period;
        (b) the first and second iris images being obtained without varying illumination intensity incident upon the imaged iris; and
        (c) a reflection imaged within the second iris image having any of (i) smaller size (ii) lower intensity (iii) lower incidence of pixel saturation, (iv) lower incidence of pixel-saturation caused interference with a multi-peak irradiance profile, and (v) higher clarity, when compared to the same reflection detected within the first iris image.

9. The system of claim 8, wherein a first configuration of the imaging apparatus for achieving the first exposure period differs from a second configuration of the imaging apparatus for achieving the second exposure period, in terms of one or both of a shutter speed setting or an integration time setting.

10. The system of claim 8, wherein the processor is configured to reject an imaged iris as counterfeit, responsive to ascertaining that variation between
   (i) a first set of image characteristics of a reflection detected in the first iris image; and
   (ii) a second set of image characteristics of the same reflection detected in the second iris image,
   is inconsistent with a predicted variation in said first and second set of image characteristics.

11. The system of claim 10, wherein the processor is configured such that, determining that the imaged iris is counterfeit is based on:
   the predicted variation in the first and second set of image characteristics of a reflection comprising a prediction that the reflection imaged within the first iris image has any of (i) larger size (ii) higher intensity (iii) higher incidence of pixel saturation, (iv) higher incidence of pixel-saturation caused interference with a multi-peak irradiance profile, and (v) lower clarity, when compared to the same reflection detected within the second iris image.

12. A computer program product for spoof detection for iris based biometric recognition, comprising a non-transitory computer usable medium having a computer readable program code embodied therein, the computer readable program code comprising instructions for:

obtaining a first image of an iris at an imaging apparatus configured to a first exposure setting;

obtaining a second image of the iris at the imaging apparatus configured to a second exposure setting;

comparing incidence of reflection patterns within the first and second iris images;

determining authenticity of the imaged iris based on a result of comparing the incidence of reflection patterns within the first and second iris images;

wherein an imaged iris is determined to be authentic responsive to:
   (i) the first exposure setting defining a first exposure period for image acquisition by an image sensor;
   (ii) the second exposure setting defining a second exposure period for image acquisition by the image sensor;
   (iii) the second exposure period being shorter than the first exposure period;
   (iv) the first and second iris images being obtained without varying illumination intensity incident upon the imaged iris; and
(v) a reflection imaged within the second iris image having any of (i) smaller size (ii) lower intensity (iii) lower incidence of pixel saturation, (iv) lower incidence of pixel-saturation caused interference with a multi-peak irradiance profile, and (v) higher clarity, when compared to the same reflection detected within the first iris image.

* * * * *